US005566249A

United States Patent [19]
Rosenlof et al.

[11] Patent Number: 5,566,249
[45] Date of Patent: Oct. 15, 1996

[54] APPARATUS FOR DETECTING BUBBLES IN COVERSLIP ADHESIVE

[75] Inventors: Mikel D. Rosenlof, Boulder, Colo.; Chih-Chau L. Kuan, Redmond, Wash.

[73] Assignee: NeoPath, Inc., Redmond, Wash.

[21] Appl. No.: 309,077

[22] Filed: Sep. 20, 1994

[51] Int. Cl.$^6$ ........................................... G06K 9/00
[52] U.S. Cl. ........................ 382/257; 382/128; 382/190
[58] Field of Search ................................. 382/257, 283, 382/133, 134, 128, 144, 145, 146, 147, 149, 169, 170, 172, 173, 190, 192, 195, 199, 203, 204, 224, 256, 258, 259, 260, 263, 308, 293, 291, 286, 282, 264, 266, 268, 275, 274, 271, 269, 270

[56] References Cited

U.S. PATENT DOCUMENTS

| | | | |
|---|---|---|---|
| 3,824,393 | 7/1974 | Brain | 250/222 PC |
| 4,175,860 | 11/1979 | Bacus | 356/39 |
| 4,182,046 | 1/1980 | Ludlow et al. | 33/366 |
| 4,191,940 | 3/1980 | Polcyn et al. | 340/146.3 B |
| 4,354,501 | 10/1982 | Colley et al. | 128/663 |
| 4,354,502 | 10/1982 | Colley et al. | 128/663 |
| 4,538,299 | 8/1985 | DeForest | 382/133 |
| 4,842,900 | 6/1989 | Miyamoto | 427/348 |
| 4,965,725 | 10/1990 | Rutenberg | 364/413.1 |
| 4,980,923 | 12/1990 | Kawamoto et al. | 382/257 |
| 5,012,524 | 4/1991 | Le Beau | 382/257 |
| 5,072,382 | 12/1991 | Kamentsky | 382/133 |
| 5,131,049 | 7/1992 | Bloomberg et al. | 382/257 |
| 5,182,938 | 2/1993 | Merkel | 73/19.05 |
| 5,240,606 | 8/1993 | Lapidus et al. | 210/232 |
| 5,257,182 | 10/1993 | Luck et al. | 364/413.1 |
| 5,287,272 | 2/1994 | Rutenberg et al. | 364/413.01 |
| 5,315,700 | 5/1994 | Johnston et al. | 395/163 |
| 5,361,140 | 11/1994 | Hayenga et al. | 358/446 |

OTHER PUBLICATIONS

Bacus, James W. et al., "Optical Microscope System for Standardized Cell Measurements and Analyses", *Applied Optics*, vol. 26, No. 16, pp. 3280–3293, 15 Aug. 1987.

Bartels, Peter H., et al., "A Self–Learning Computer Program for Cell Recognition", *ACTA Cytologica: The Journal of Clinical Cytology*, 14:8, pp. 486–494, Oct. 1970.

Breiman, Leo "Chapter 2: Introduction To Tree Classification", pp. 18–58, *Classification and Regression Trees*, Wadsworth & Brooks/Cole Advanced Books & Software, Pacific Grove, California, 1984.

Duda, Richard O. and Peter E. Hart, "Fisher's Linear Discriminant", *Patent Classification and Scene Analysis*, Copyright ©1973, pp. 114–119. (No Publisher Or Place Of Publication).

Chapter 39: "The STEPDISC Procedure", *SAS/STAT User's Guide*, vol. 2, pp. 1493–1509, SAS Institute Inc. (No Date & No Place) (No Author).

(List continued on next page.)

*Primary Examiner*—Leo Boudreau
*Assistant Examiner*—Bijan Tadayon
*Attorney, Agent, or Firm*—Leone & Moffa, P.A.

[57] ABSTRACT

The detection of bubbles in coverslip adhesive. Bubbles in coverslip adhesive may span large areas of the coverslip. An automated cytology system acquires 4 x gray scale images of the slide. Image conditioning is then performed. The conditioned gray scale image is binomially filtered providing a binomial filtered image. The gray scale image is subtracted from the binomial filtered image to produce a high pass enhanced image. An object mask detection is then performed on the high pass enhanced image. Objects are classified to identify bubble edgest. Multiple detections of bubble edges are pieced together to detect bubbles much larger than the area covered by a single image from the detector and the microscope lens. Bubbles are located even if low level image analysis shows gaps in the edges. The cytological system fills in significant gaps in the detected bubble edges. The result is then used for further processing by the automated cytology system.

26 Claims, 16 Drawing Sheets

OTHER PUBLICATIONS

Tanaka, Noboru, et al., "Automated Cytologic Screening System (CYBEST Model 4): an Integrated Image Cytometry System", *Applied Optics*, vol. 26, No. 16, pp. 3301–3307, Aug. 15, 1987. Copyright ©1987 by the Optical Society of America.

Weber, J. E. et al., "Fuzzy Reasoning, Possibility Theory and Probability Theory in Expert Systems for Histopathology", IEEE/Ninth Annual Conference of the Engineering in Medicine and Biology Society, pp. 1560–1562, ©1987 (No Place).

Wied, G. L. et al., "Expert Systems as Classifiers in Diagnostic Cytopathology", IEEE/Ninth Annual Conference of the Engineering in Medicine and Biology/Society, pp. 1915–1917, ©1987. (No Place).

Wied, G. L. et al., "Expert System Design Under Uncertainty of Human Diagnosticians", IEEE/Eighth Annual Conference of the Engineering in Medicine and Biology Society, pp. 757–760, ©1986. (No Place).

Wied, G. L. et al., "Ticas–Stratex, an Expert Diagnostic System For Stratified Cervical Epithelium", IEEE/Ninth Annual Conference of the Engineering in Medicine and Biology Society, pp. 1557–1559, ©1987. (No Place).

Serra, J., *Image Analysis and Mathematical Morphology*, pp. 372–423, Academic press, 1982. (No Place), "Connectivity Criteria".

Smith, Warren J., "Image Evaluation", *Modern Optical Engineering: The Design of Optical Systems*, McGraw–Hill Book Company, 1966, pp. 308–325. (New York).

Patten, Jr., Stanley, "Diagnostic Cytopathology of the Uterine Cervix", Basel, Switzerland, Publisher: S. Karger, 1969, 2nd Edition 1978, Third volume in *Monographs in Clinical Cytology*, edited by G. L. Wied, pp. 10–15.

Kurman, Robert J. et al., "Part 1: Specimen Adequacy" and Part 2: Descriptive Diagnoses, *The Bethesda System for Reporting Cervical/Vaginal Cytologic Diagnoses*, Springer–Verlag. (New York)–(No Page Number) (No Date).

Dytch, Harvey E. et al., "An Interactive Microcomputer-Based System for the Quantitative Analysis of Stratified Tissue Sections", *Analytical and Quantitative Cytology and Histology*, vol. 9, No. 1, pp. 69–78, Mar. 1987.

Enslein, Kurt and Peter W. Neurath, "Augmented Stepwise Discriminant Analysis Applied to Two Classification Problems in the Biomedical Field", *Computers and Biomedical Research*, 2, 568–581 (1969).

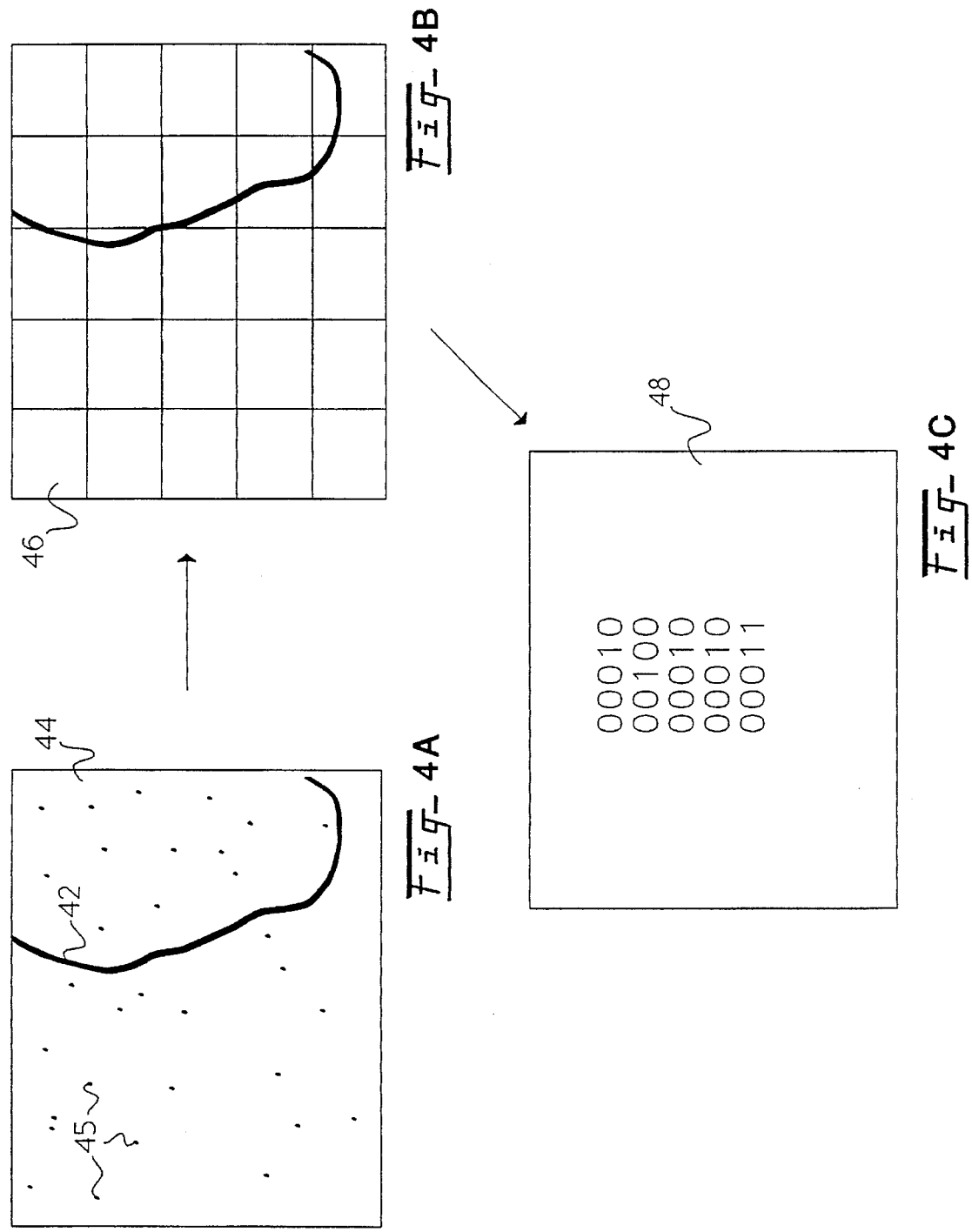

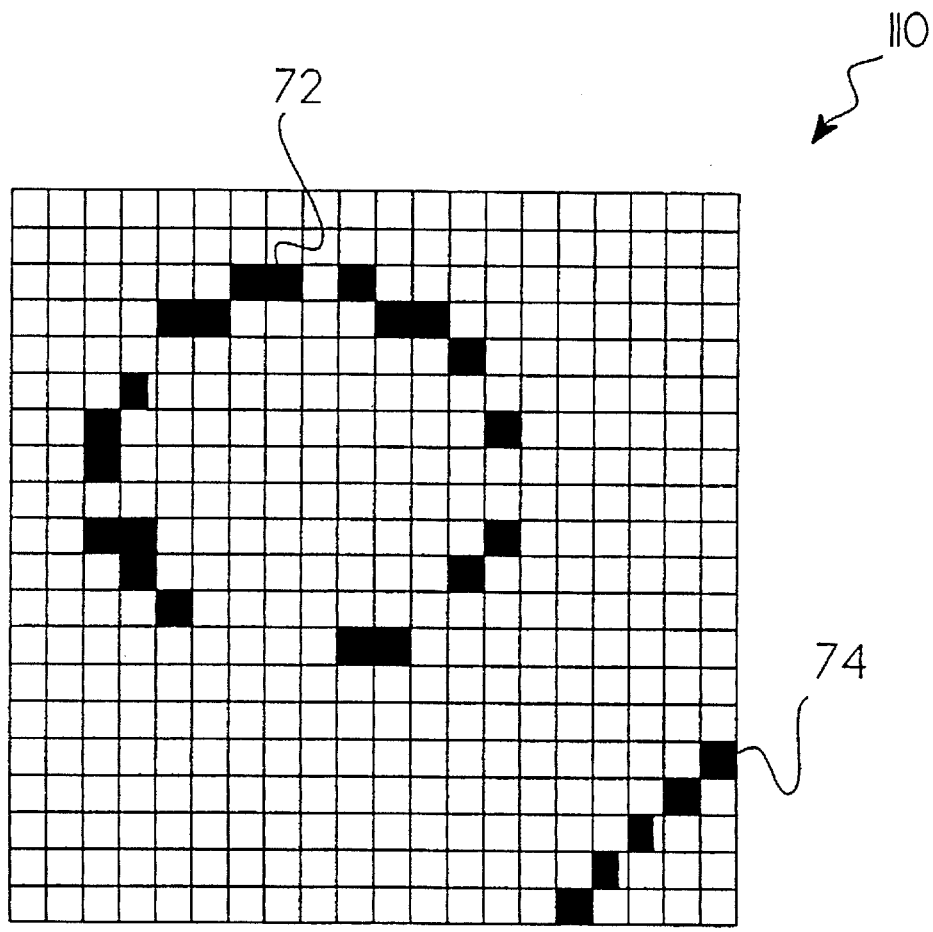
Fig_6

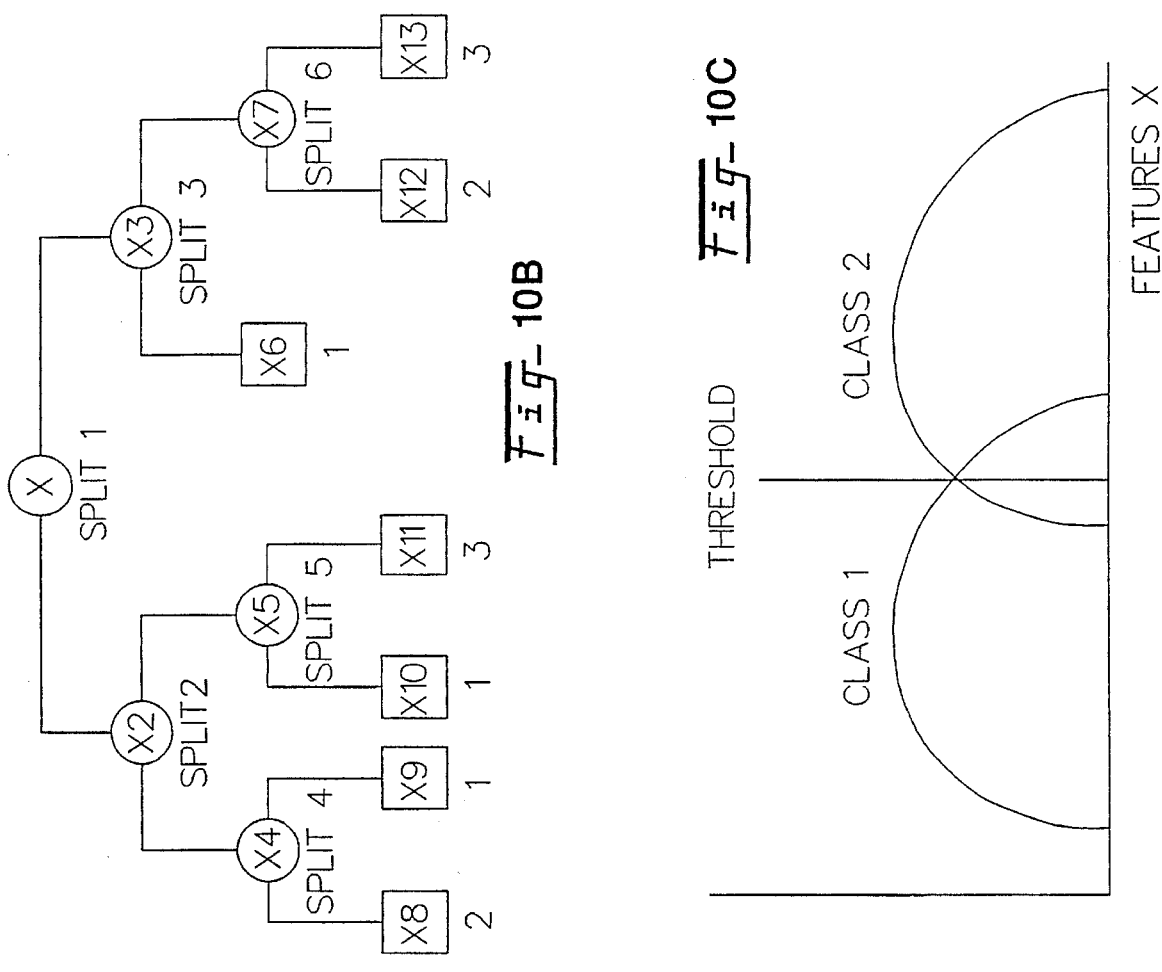

APPARATUS FOR DETECTING BUBBLES IN COVERSLIP ADHESIVE

The invention relates to an automated microscope cytological classifier and, more particularly, to an automated cytological classifier that includes an apparatus for detecting bubbles in coverslip adhesive.

BACKGROUND OF THE INVENTION

Bubbles, or other voids in coverslip adhesive used to hold coverslips to individual microscope slides, add extra air to glass surfaces and in other ways change the way objects are resolved by a microscope objective. For a system making precise measurements of objects in the specimen, these changes make measurements on the objects within the voids unreliable and therefore unusable.

The edges of the bubbles are themselves resolved as heavy dark objects which are not of interest to the system analyzing the specimen. Therefore, it is undesirable to spend time trying to focus and analyze the bubble edges at high magnification.

The prior art has detected bubbles within liquids flowing through tubes, in essence, a one dimensional problem. The common technique is to use a photosensor of some type which detects the boundary between the liquid and the bubble.

Referring not to FIG. 11, a typical microscope slide 10 is shown exhibiting voids or bubbles in the coverslip adhesive. The microscope slide 10 comprises a plate 12 including an identification area 11. A coverslip 14 is placed over a specimen using an adhesive. The placement of the coverslip 14 sometimes unfortunately results in bubbles forming in the adhesive. In this example bubbles are shown as circular bubble 15, irregular bubble 17 and edge bubble 16. Since the perimeters of such bubbles usually exceed the field of view of microscopes used to view such slides, the size or existence of such bubbles often goes undetected.

SUMMARY OF THE INVENTION

The invention provides an apparatus and method for detecting bubbles in coverslip adhesive. Bubbles in coverslip adhesive may span large areas of the coverslip. The apparatus of the invention starts by acquiring 4 x gray scale images of the coverslip. Each image is approximately 1.408 mm by 1.408 mm, and the entire set of images collected tiles the region under the coverslip. Image conditioning is performed on each 4 x image. Each conditioned gray scale image is binomially filtered providing a binomial filtered image. The conditioned gray scale image is subtracted from the binomial filtered image to produce a high pass enhanced image. An object mask detection is performed on the high pass filtered image. The results of the object mask detection are passed through a classifier to identify bubble edges. The bubble edges from all 4 x images are pieced together to form a map of bubbled edges over the entire coverslip area. The edges are analyzed and the bubbles in the map are separated from each other and their outlines are filled to include the interiors of each bubble. The resulting filled bubble areas are eliminated from further processing by the automated microscope of the automated cytological classifier of the system.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIGS. 4A, 4B and 4C show the air bubble edge detection method of the invention as applied to a thresholded object.

FIG. 6 shows the original bubble map.

FIG. 10A shows a method of the invention used to train a classifier.

FIG. 10B shows one example of a decision tree classifier of the invention.

FIG. 10C illustrates a graphical description of the method of the invention for finding a threshold value.

DETAILED DESCRIPTION OF THE PREFERRED EMBODIMENT

Figure 1A:
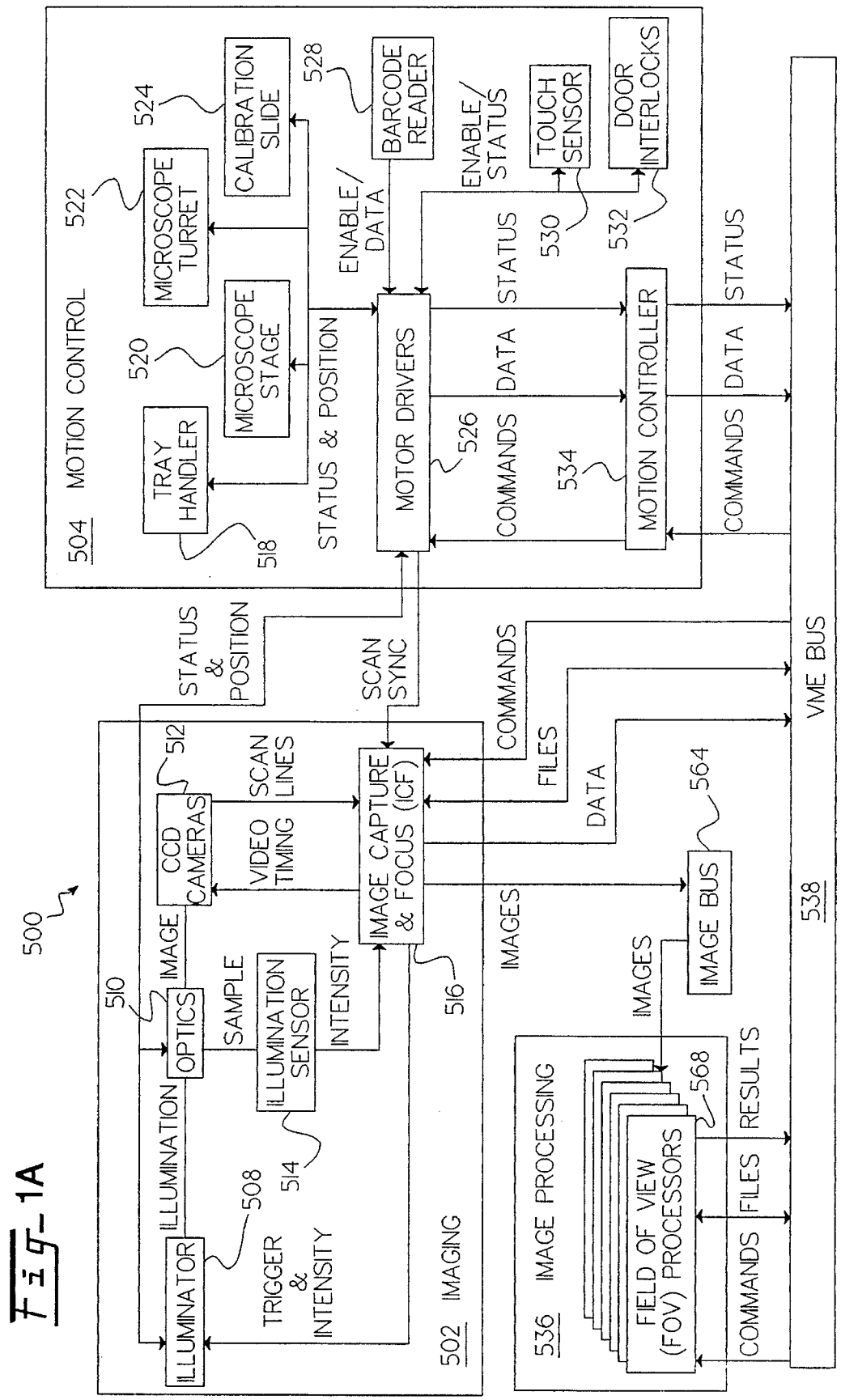
FIGS. 1A, 1B and 1C show a schematic diagram of the apparatus of the invention.

In a presently preferred embodiment of the invention, the system disclosed herein is used in a system for analyzing cervical pap smears, such as that shown and disclosed in U.S. patent application Ser. No. 07/838,064, entitled "Method For Identifying Normal Biomedical Specimens", by Alan C. Nelson, et al., filed Feb. 18, 1992; U.S. patent application Ser. No. 08/179,812 filed Jan. 10, 1994 which is a continuation in part of U.S. patent application Ser. No. 07/838,395, entitled "Method For Identifying Objects Using Data Processing Techniques", by S. James Lee, et al., filed Feb. 18, 1992; U.S. patent application Ser. No. 07/838,070, now U.S. Pat. No. 5,315,700, entitled "Method And Apparatus For Rapidly Processing Data Sequences", by Richard S. Johnston, et al., filed Feb. 18, 1992; U.S. patent application Ser. No. 07/838,065, filed Feb. 18, 1992, entitled "Method and Apparatus for Dynamic Correction of Microscopic Image Signals" by Jon W. Hayenga et al.; and U.S. patent application Ser. No. 08/302,355, filed Sep. 7, 1994 entitled "Method and Apparatus for Rapid Capture of Focused Microscopic Images" to Hayenga et al., which is a continuation-in-part of application Ser. No. 07/838,063 filed on Feb. 18, 1992 the disclosures of which are incorporated herein, in their entirety, by the foregoing references thereto.

The present invention is also related to biological and cytological systems as described in the following patent applications which are assigned to the same assignee as the present invention, filed on Sep. 20, 1994 unless otherwise noted, and which are all hereby incorporated by reference including U.S. patent application Ser. No. 08/309,118, to Kuan et al. entitled, "Field Prioritization Apparatus and Method," U.S. patent application Ser. No. 08/309,061 to Wilhelm et al., entitled "Apparatus for Automated Identification of Cell Groupings on a Biological Specimen," U.S. patent application Ser. No. 08/309,116 to Meyer et al. entitled "Apparatus for Automated Identification of Thick Cell Groupings on a Biological Specimen," U.S. patent application Ser. No. 08/309,115 to Lee et al. entitled "Biological Analysis System Self Calibration Apparatus," U.S. patent application Ser. No. 08/308,992, to Lee et al. entitled "Apparatus for Identification and Integration of Multiple Cell Patterns," U.S. patent application Ser. No. 08/309,063 to Lee et al. entitled "A Method for Cytological System Dynamic Normalization," U.S. patent application Ser. No. 08/309,248 to Rosenlof et al. entitled "Method and Apparatus for Detecting a Microscope Slide Coverslip," U.S. patent application Ser. No. 08/309,931, to Lee et al. entitled "Cytological Slide Scoring Apparatus," U.S. patent application Ser. No. 08/309,148 to Lee et al. entitled "Method and Apparatus for Image Plane Modulation Pattern Recognition," U.S. patent application Ser. No. 08/309,250 to Lee et al. entitled "Apparatus for the Identification of Free-Lying Cells," U.S. patent application Ser. No. 08/309,209 to Oh et al. entitled "A Method and Apparatus for Robust Biological Specimen Classification," U.S. patent application Ser. No. 08/309,117, to Wilhelm et al. entitled "Method and Apparatus for Detection of Unsuitable Conditions for Automated Cytology Scoring."

It is to be understood that the various processes described herein may be implemented in software suitable for running on a digital processor. The software may be embedded, for example, in the central processor 540.

Figure 1B:
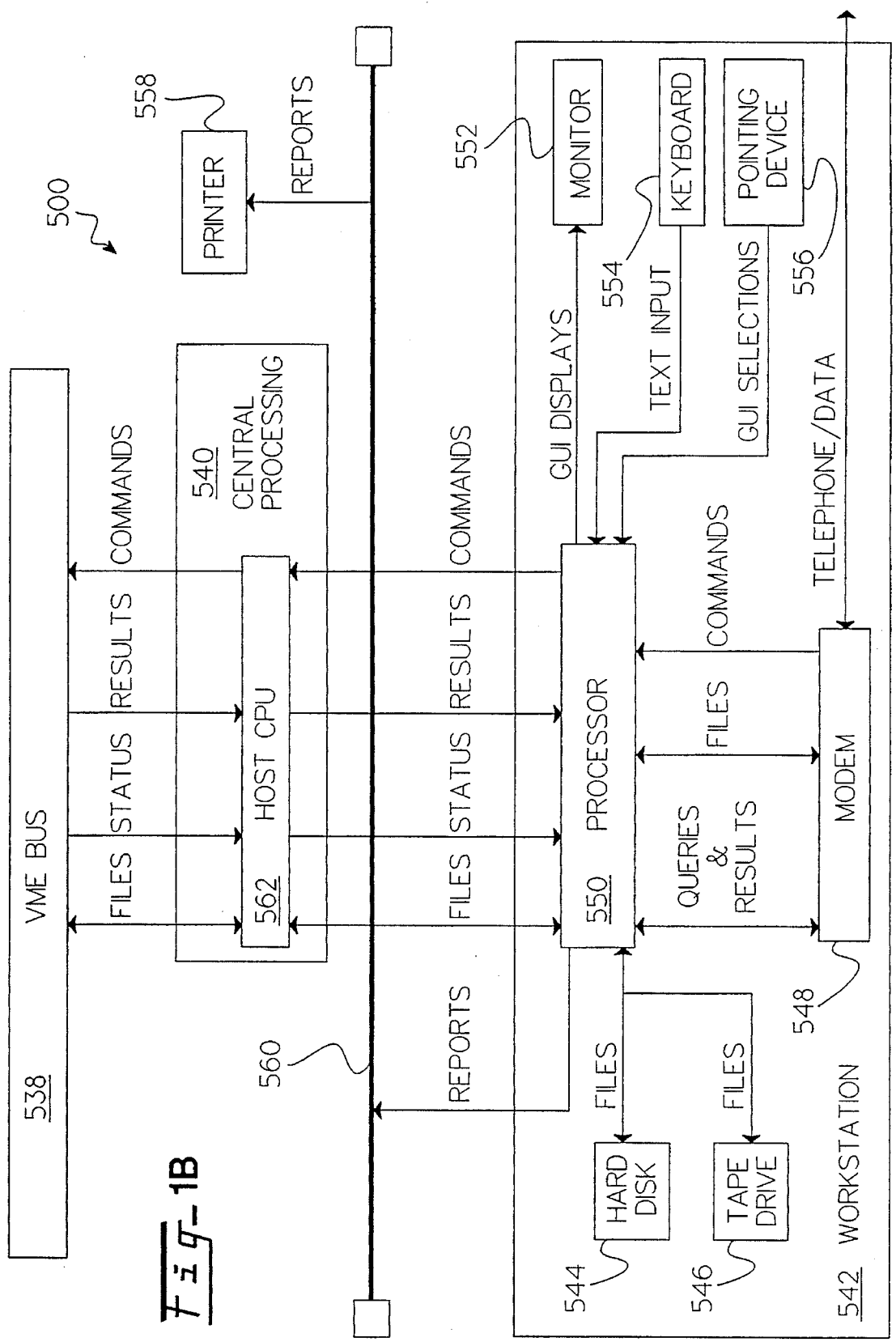
Figure 1C:
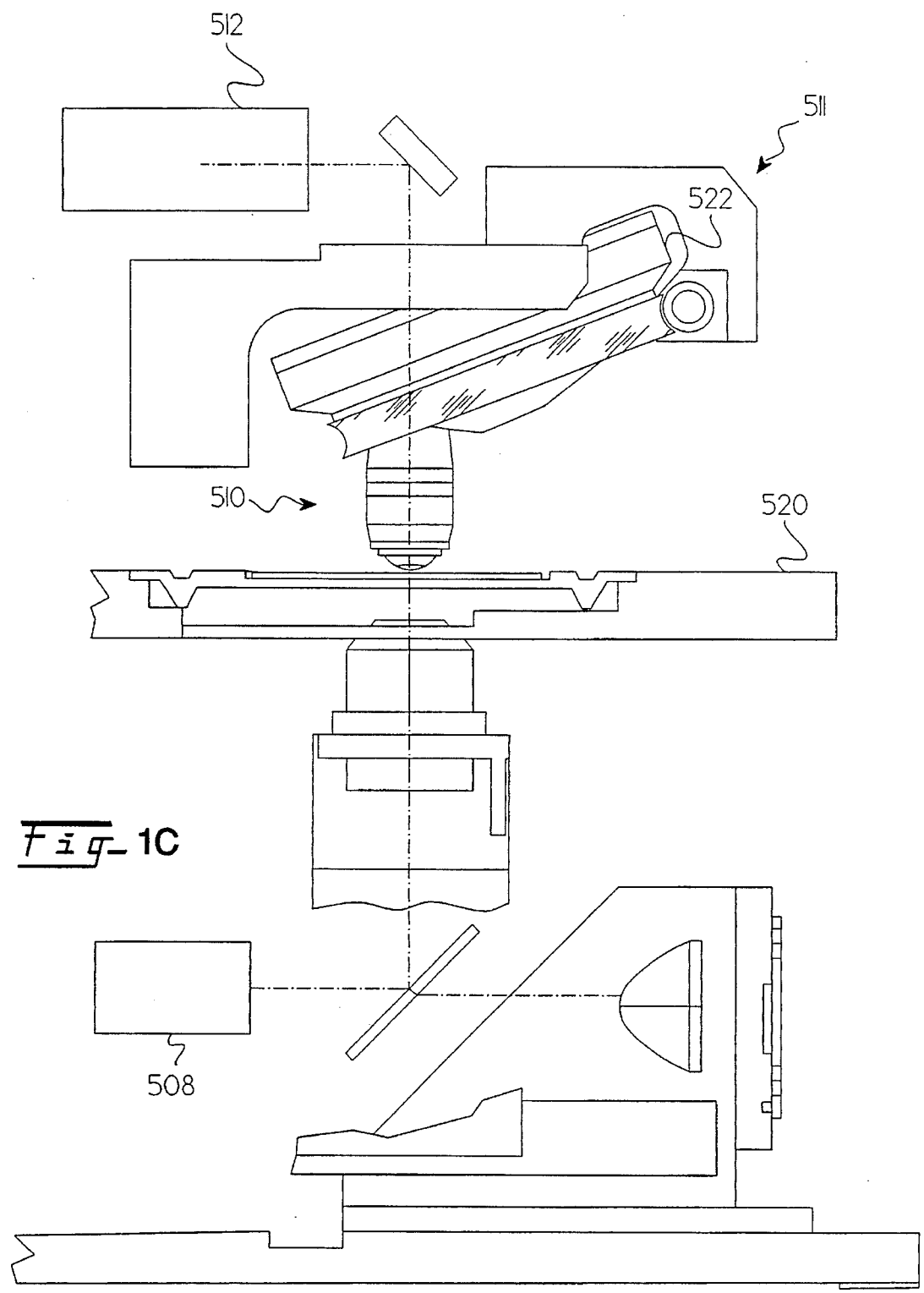

Now refer to FIGS. 1A, 1B and 1C which show a schematic diagram of one embodiment of the apparatus of the invention for detecting bubbles in coverslip adhesive. The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a MOTOROLA 68030 (TM) CPU. The motion controller 504 is comprised of a tray handler 518, a microscope stage controller 520, a microscope tray controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet communication system 560 communicates to a workstation 542 to provide control of the system. A hard disk 544 is controlled by workstation 550. In one embodiment, workstation 550 may comprise a Sun SPARC Classic (TM) workstation. A tape drive 546 is connected to the workstation 550 as well as a modem 548, a monitor 552, a keyboard 554, and a mouse pointing device 556. A printer 558 is connected to the ethernet 560.

During the time when bubble edge detection is performed, the central computer 540, running a real time operating system, controls the microscope and the processor to acquire and digitize images from the microscope. The flatness of the slide may be checked, for example, by contacting the four corners of the slide using a computer controlled touch sensor. The computer 540 also controls the microscope stage to position the specimen under the microscope objective, and from one to 15 field of view (FOV) processors 568 which receive images under control of the computer 540.

The bubble detection process of the invention is divided into two sub-processes. One subprocess, bubble edge detection FOV processing, is performed on the image processing computers 536 to analyze one image per FOV acquired from the microscope 510 and determine if bubble edges exist or not. The second sub-process, FOV processing result collection and analysis, directs a searching pattern, collects the individual image results from the image processing computers 536, and analyzes the collected data to determine the overall bubble regions given the detected bubble edges.

The bubble edge detection FOV processing method of the invention is designed to process low power, such as 4 x, microscope images and locate objects that are potential edges of air-bubbles on a cover-slipped microscope slide. The segmentation process and the parameters are designed based on the overall image characteristics of a training image set in order to segment out the most objects of interest.

Figure 2:
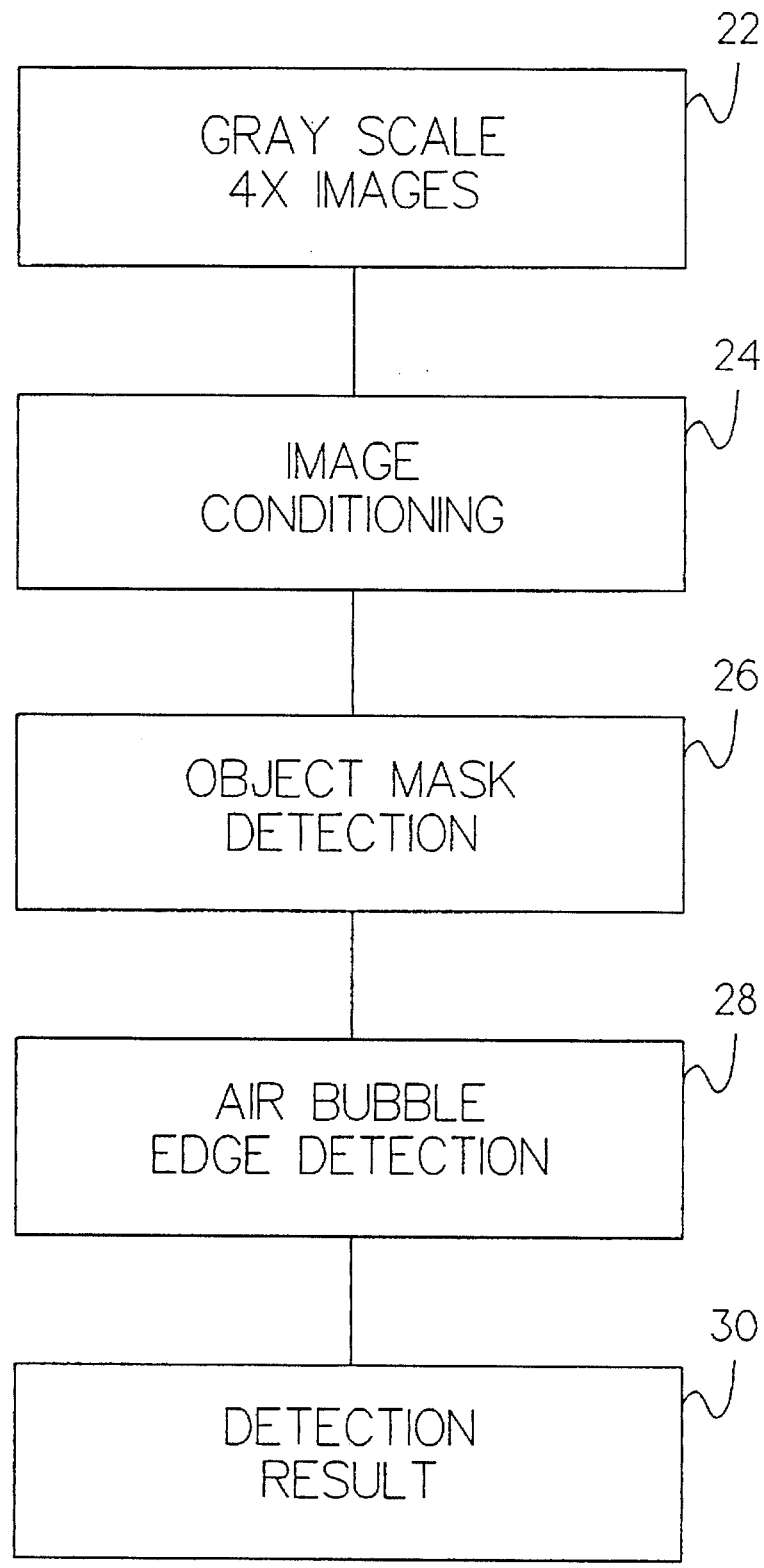
FIG. 2 shows the image segmentation process of the invention.

Refer now to FIG. 2 which illustrates an edge detection method as used in one embodiment of the invention. The edge detection method comprises the steps of acquiring a gray scale image 22, image conditioning 24, object mask detection 26, air bubble edge detection 28 and producing a result 30. In the image conditioning step 24, gray scale 4 x images from step 22 are clipped to limit image pixel values that range between 0 and 255 to a detection range of 25 to 180 thus providing a conditioned image. Objects of interest, i.e. bubble edges, should be well within this range. However, pixels of slide background may go beyond this range.

The object mask detection step 26 performs high-pass filtering on the conditioned image from step 24. It should be understood that, in general, the low spatial frequency component of an image corresponds to the image's background, which are areas of gradual, or smooth, change in contrast. The high spatial frequency component of an image corresponds to sharp changes of pixel values of neighboring pixels. Therefore, since the objective of the segmentation process of the invention is to find pixels that represent bubble edges, a high-pass filtering technique is used. In implementation, a binomial filtering method of kernel size 5×5 is used. These results of one scan line of such a binomial filtered image obtained from the gray scale image 32 are illustrated in FIGS. 3A, 3B and 3C.

Figure 3A:
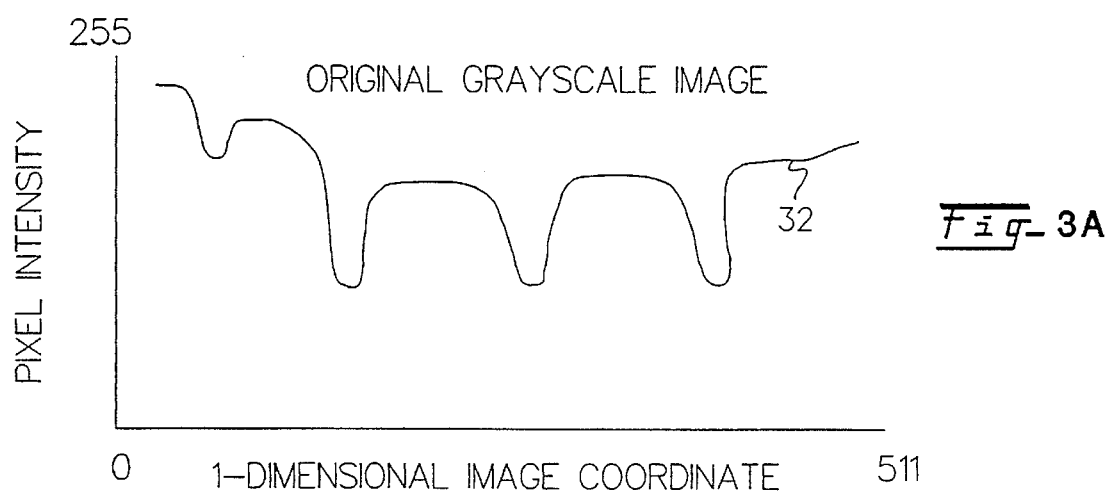
FIGS. 3A, 3B and 3C show the effect of the object mask detection method of the invention when applied to one scan line of a typical image.
Figure 3B:
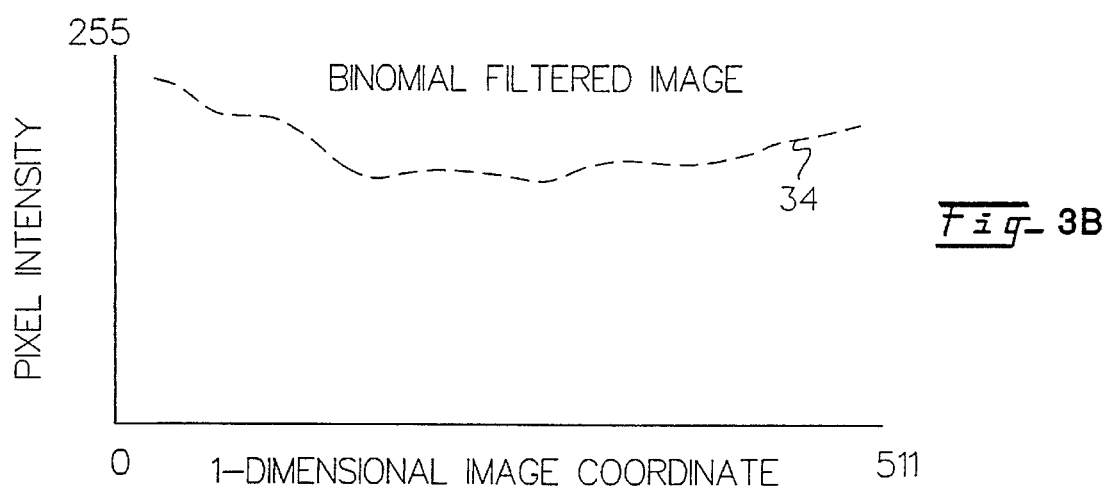
Figure 3C:
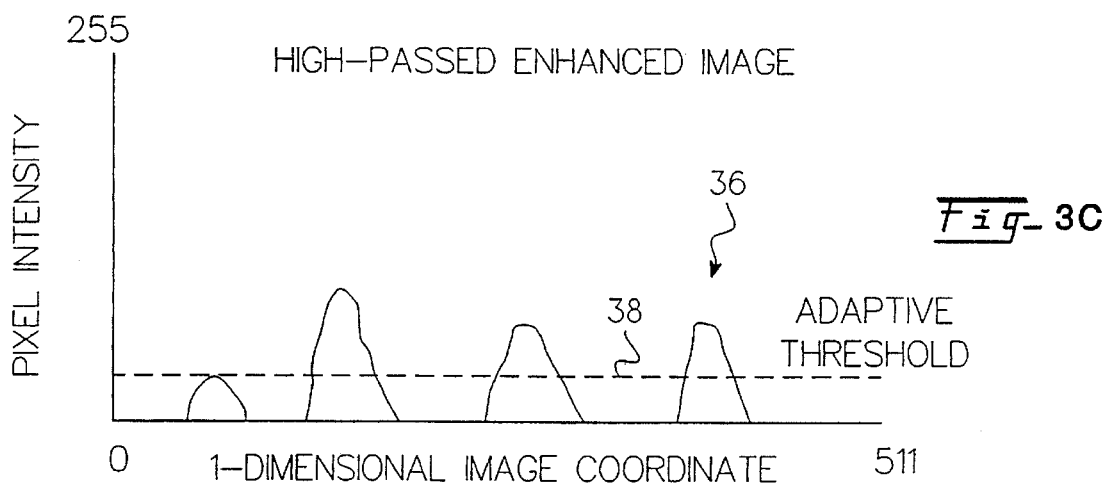

Referring now to FIGS. 2 and FIGS. 3A, 3B, and 3C simultaneously, note that FIGS. 3A, 3B, and 3C show a pixel intensity profile of a one-dimensional line of an image 32 represented therein in graphical form. In FIG. 3A, the gray scale image has been clipped to limit the gray scale dynamic range as part of the image conditioning step 24. Since objects at 4 x magnification are small, a binomial filtering method using a 5×5 pixel kernel is applied. The result is the binomial filtered image 34 shown in FIG. 3B. The original image 32 is then subtracted from the binomial filtered image 34 producing the high-passed enhanced image 36 illustrated as a plurality of peaks in FIG. 3C. The high-pass operation substantially removes any low frequency component representative of the low contrast area of an image.

To accommodate local contrast variation in an image, the high-passed enhanced image may advantageously be partitioned into a 5×5 array of sub-images or zones, then each zone is adaptively thresholded by its threshold value 38. Each adaptive threshold value is computed based on pixel histograms from the zone. Threshold values selected by this method are based on the criteria of maximizing between-class variance. The two classes of pixels in an image are the object-pixel class and the background pixel class. The result of the air bubble edge detection step 28 is a binary image containing a mask of potential edges along with smaller high frequency clutter 45, as shown in FIG. 4A.

FIGS. 4A, 4B and 4C show an illustration of air bubble edge detection. The bubble edge detection process of the invention may work at a coarse image resolution since bubble edges are usually much wider and longer than 2–3 pixels. Therefore, the thresholded image from the previous step is first down-sampled. A down-sampled image is generated by selecting every other pixel both horizontally and vertically from the original resolution image, reducing the data volume to one quarter of that of the original image. This reduction increases processing speed.

Next, morphological operations remove isolated single pixels since they are assumed not to be part of the bubble images. Two morphological opening operations using structure elements of size 1×2 and 2×1 are performed individually, then a logical OR (sum) of the results from the two opening operations is generated.

The invention detects foreground pixels forming objects of various shapes in the binary images using connected component analysis. Large objects, greater than 100 pixels in size for example, are detected. The shape attributes of these large objects are detected as well. Attributes of these large objects are passed through a classifier to identify those objects that meet the size and shape criteria of bubble edges 42. The classifier's size and shape parameters are derived from a set of exemplar images that contain air bubble edges.

The classifier apparatus 500 of the invention is trained to recognize air bubble edges using a classifier. For object classifier training, the training data collected are the images containing the objects which are potential bubble edges. Features of the object are measured. The discrimination capabilities of the measured features from the objects vary from very strong to very weak. The process of developing classifiers for certain types of objects such as abnormal squamous cells, or bubble edges, etc., from images comprises several major steps.

Referring now to FIG. 10A, FIG. 10A shows the method of the invention used to train a classifier. First images of sample objects are collected in step 702 from the slide. Features are computed from the objects in step 704. Features are selected among the features that were computed in step 706. The classifier is built in step 710. The details of the classifier construction are described below. The performance of the classifier is evaluated in step 712.

Referring now to FIG. 10B, FIG. 10B shows one example of a decision tree classifier of the invention. In a decision tree classifier, all features have a statistical distribution. Mathematically, the invention determines which feature has the most potential discriminating power. The discriminating power is based on a cost-error function. The cost-error function is designed to find a predetermined percent of true conditions as true. This predetermined percent is known as the sensitivity of the cost function. In one example of the invention the cost function may be set equal to 0.90. This sensitivity is applied to every feature. In one preferred embodiment, the invention calculates an error and steps through the range of all feature values from the lowest value in the data to the highest value in the data to find a minimum cost function.

Refer to FIG. 10C for a graphical description of the method. A threshold was found by minimizing the total number of trues that are called false plus the total number of falses that are called trues times their respective weighting functions.

In applying the sensitivity value to the decision tree classifier, the apparatus of the invention checks all ranges between the minimum and maximum feature values. It computes the error using the error functions and compares the error against stopping rules. A stopping rule determines when to stop splitting the decision tree. Thus, an object or slide will be classified by first computing its feature values then applying the logic as determined by the classification tree during training.

In summary, the invention takes training objects and computes their features. The statistical analysis determines the confidence level using the sensitivity function and a range is determined with a threshold value. This threshold value represents the minimum error for this particular feature set. The object then may be classified by determining whether the particular feature value is above, below or equal to the threshold.

Images are processed to calculate features for each segmented object. Features are numeric measurements. The number of features computed is large, for example, the number may comprise over 140 features. The feature selection process then determines a subset of features that can best discriminate different classes of objects in the training data set. Some typical methods used for feature selection are the discriminant analysis method, see Pattern Classification and Scene analysis, by R. Duda & P. Hart, 1973, and Stepdisc Procedure, SAS, SAS Institute Inc.

Finally, based on the selected features from the training data set, a classifier is built. In general, the methodology used is similar to the decision tree methodology described above. See also Classification and Regression Trees, by L. Breiman, J. Friedman, et al., Wadsworth & Brooks, 1984.

Referring now to FIG. 10B, FIG. 10B shows one example of a decision tree classifier constructed by the repeated splitting of subsets of an input data set X into two descendant subsets, beginning with X itself. This process is shown for a hypothetical 3-class tree.

The sets X2 and X3 are disjoint sets, X=X2 UX3, X2= X4 U X5, etc. As a result, set X8 is classified as class 2, X9 is classified as class 1, etc.

The splitting rules at the nonterminal nodes, circles in FIG. 10B, are computed by several different methods: the single feature threshold method, or Fisher's linear feature combination thresholding method.

The single feature thresholding method will select one feature among all the available features that can best separate the data set of that nonterminal node into two disjoint sets, and set the proper threshold value. The data samples having that feature value less than the threshold go to the left descending node, the data samples having that feature value greater than or equal to the threshold go to the right descending node. Each nonterminal node determines the feature and threshold solely based on the data in that node, e.g., split2 is based on X2.

The Fisher's linear feature combination thresholding method differs from the single feature thresholding method in that all available features are used in computing the linear feature combination, i.e. the weighted sum of all features. The weights used are computed based on the Fisher's linear discriminant method, see Duda & Hart, pages 114–118. Then the threshold is set on the projected linear space using the criteria of best, minimum error rate separating the data set of that nonterminal node into two disjoint sets.

The decision to split or not to split a subset of data is based on the number of data samples or the error rate of classification. If the number of samples is small: stop splitting. Likewise if the error rate is less than a predetermined value: stop splitting. For example, data subset X6 from split3 satisfies the criteria and is classified as class1.

The performance of the constructed decision tree classifiers are evaluated by classifying an independent testing data set and computing the resulting error rate.

Those skilled in the art will recognize that the implementation of classifiers of the invention may include run-time speed-efficient coding the feature calculation functions that calculate only the selected features, and coding of the built classifier as a classifier function or may be embodied in application specific hardware.

Before applying the classification method of the invention, the slide is scanned with a 4 x microscope objective imaging a field of view (FOV) of 1.408 millimeters square onto a 512×512 pixel array. The set of images covers the entire area under the slide coverslip. As described in the previous section, each image is broken down into a 5×5 array of sub-images, see zone 46 as an example, which are analyzed to detect occurrences of bubble edges.

The results of the FOV analysis are stored in a two dimensional array dimensioned such that each of the sub-images is represented by one element in the array. The index of the array elements corresponds one to one to the positions of the sub-images on the slide. For example, a 25 by 50 millimeter cover slip is covered by approximately an array of 18 by 36 FOVs at 4 x magnification. Breaking the images into the sub-images yields an array size of 90 by 180 elements. The two dimensional array is indexed by an X index and a Y index. Element (0,0) refers to the minimumX and minimumY sub-image analyzed during the scan. Each increment of one of the elements indicates an increase of 1.408 / 5 or 0.282 millimeters in the corresponding direction.

The results from a particular FOV are stored in the corresponding position in the results array 48. The result from each sub-image is a binary value, 1 indicates a bubble edge exists at that position, 0 indicates no bubble edge. At this point, this array is referred to as a bubble edge map, and processed in order to connect the so far uncorrelated bubble edge positions.

Figure 5A:
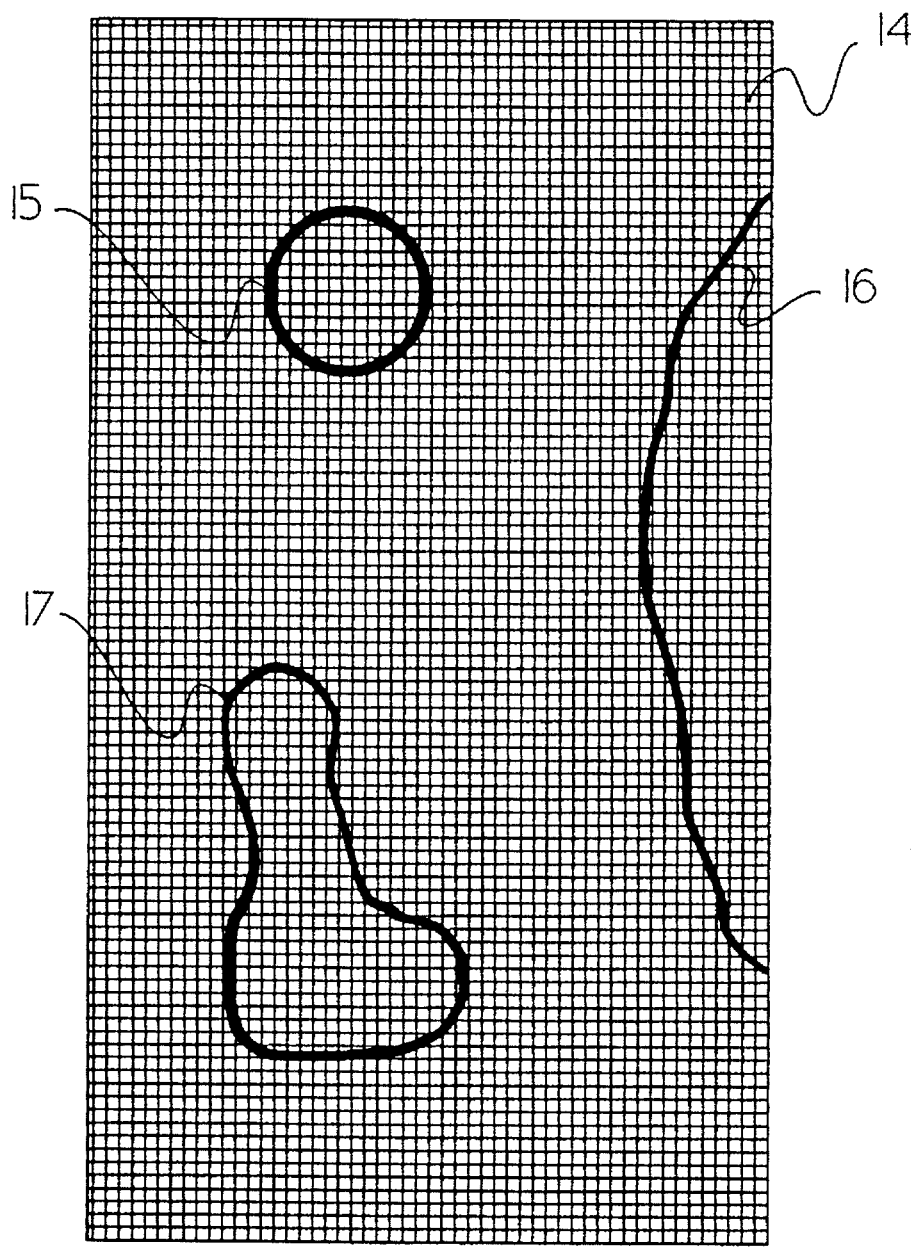
FIG. 5A shows the coverslip area covered by a grid of high power images.

FIGS. 5B, 6, 7A, 7B, 8A, 8B, 8C, 9A, 9B and 9C illustrate the operations performed on a portion of a typical bubble edge map which contains one complete bubble and a fragment of a second bubble. FIG. 5A illustrates a coverslip area covered by a grid of high power images forming a bubble edge map 110.

Figure 5B:
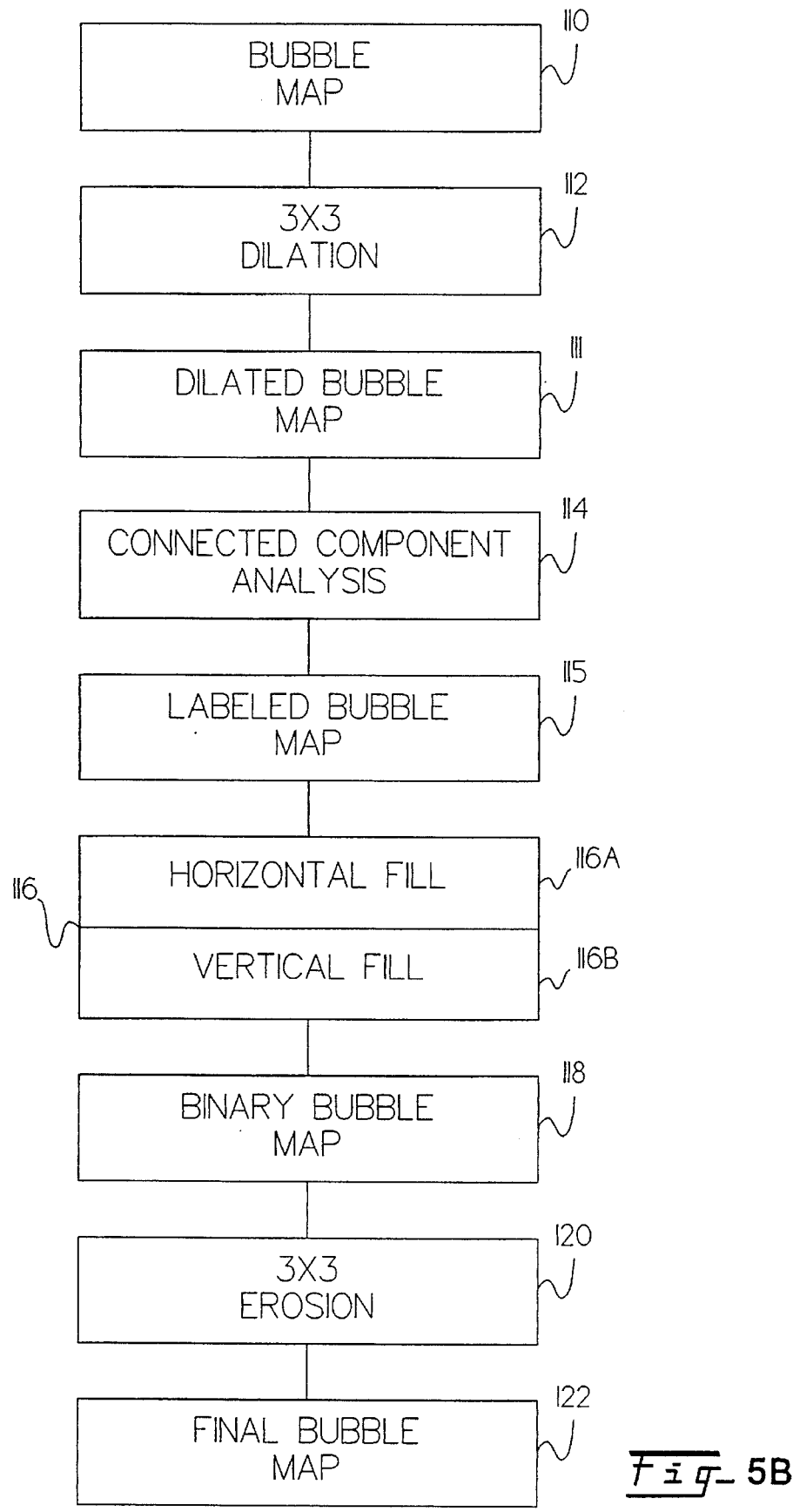
FIG. 5B shows one method of the invention to find a bubble map.

FIG. 5B illustrates a flow diagram of one example of a method of the invention to find a bubble map. The method to find a bubble map comprises starting with an original bubble edge map 110 illustrated, for example, in FIG. 6. Bubble edge map 110 is dilated at dilation step 112 yielding a dilated bubble edge map 111. The process then continues by performing connected component analysis 114, labeling the bubble edge map 115, filling in step 116, reducing the filled bubble map to binary 118, eroding the binary bubble map 120 and producing a final bubble map 122.

Figure 7A:
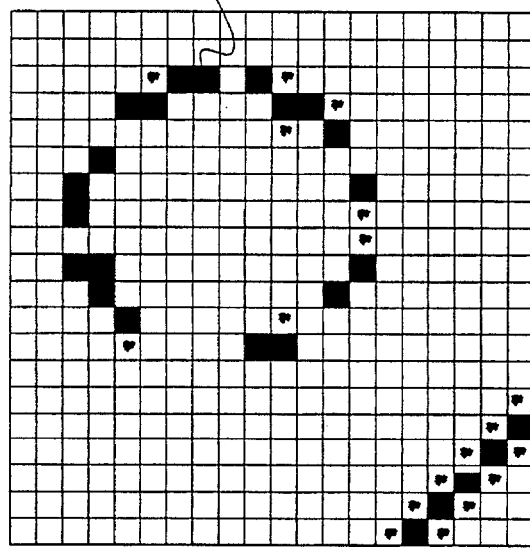
FIG. 7A shows the dilated bubble map.

FIG. 7A shows the step of dilating 112 the bubble edge map 110 by a 3×3 "+" shaped structuring element. This dilation 112 has the effect of filling gaps in a bubble edge which may have been caused by the FOV processing missing the edge in a sub-image.

Figure 7B:
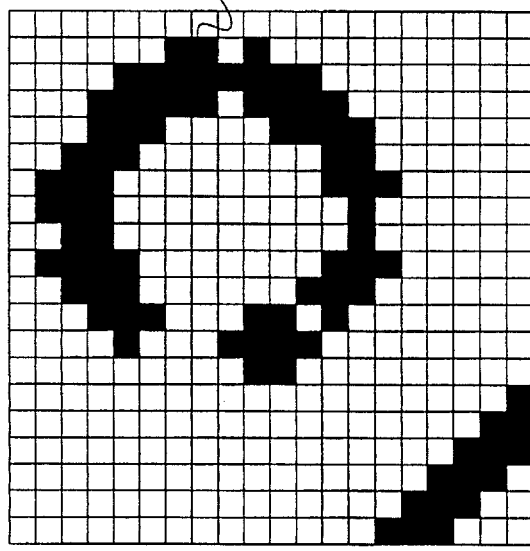
FIG. 7B shows the dilation result.

FIG. 7B shows a result of the dilation 112.

Figure 8A:
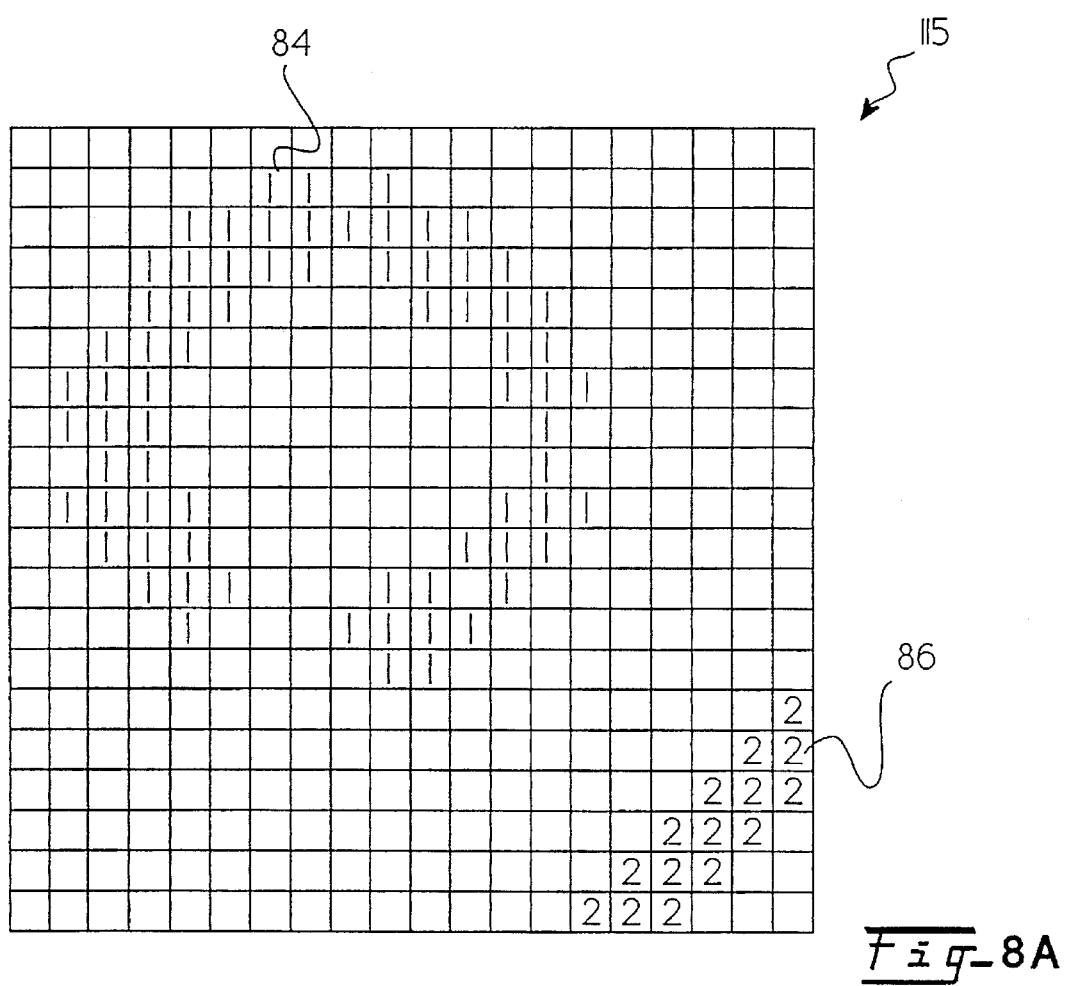
FIG. 8A shows the labelled bubble map.

FIG. 8A shows the step of performing a connected component analysis 114 with labels for each connected component. After this step, each separate object consisting of edge points adjoining other edge points is given a distinct label. The bubble map is now called the labelled bubble edge map.

Figure 8B:
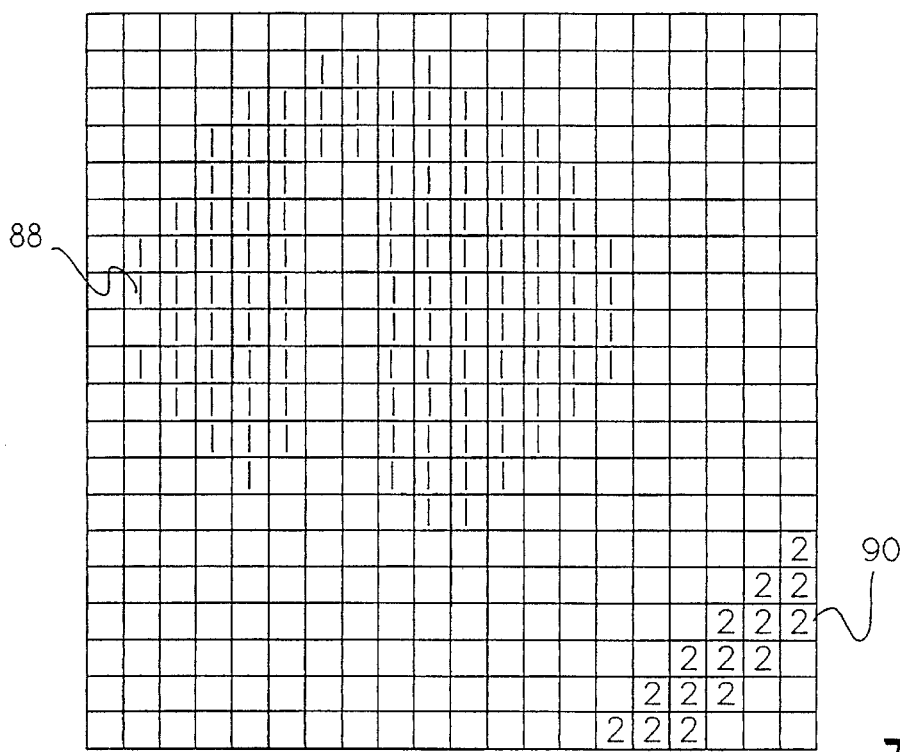
FIG. 8B shows the labelled bubble map with vertical fill.
Figure 8C:
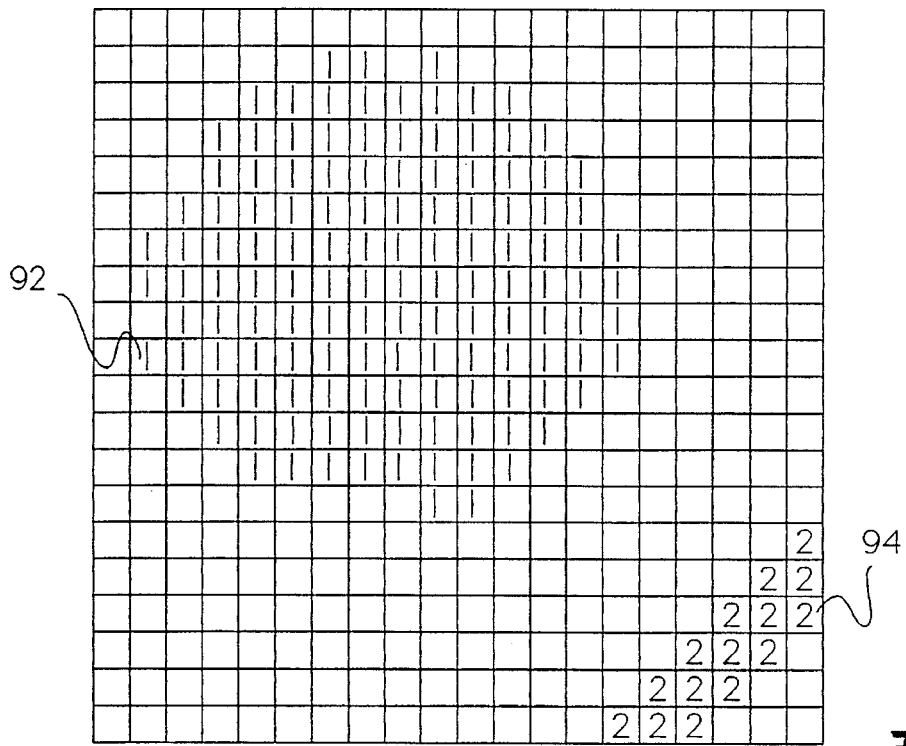
FIG. 8C shows the labelled bubble map, horizontal fill.

FIGS. 8B and 8C show the steps of filling in the connected components of the labelled bubble edge map by filling any region of a row or column bounded by elements with the same label. From the completion of this step 116, the label is no longer significant and the map is once again treated as binary 9A, and called the filled bubble map. FIG. 8B shows the vertical fill 16B step and FIG. 8C shows the horizontal fill step 16A.

Figure 9A:
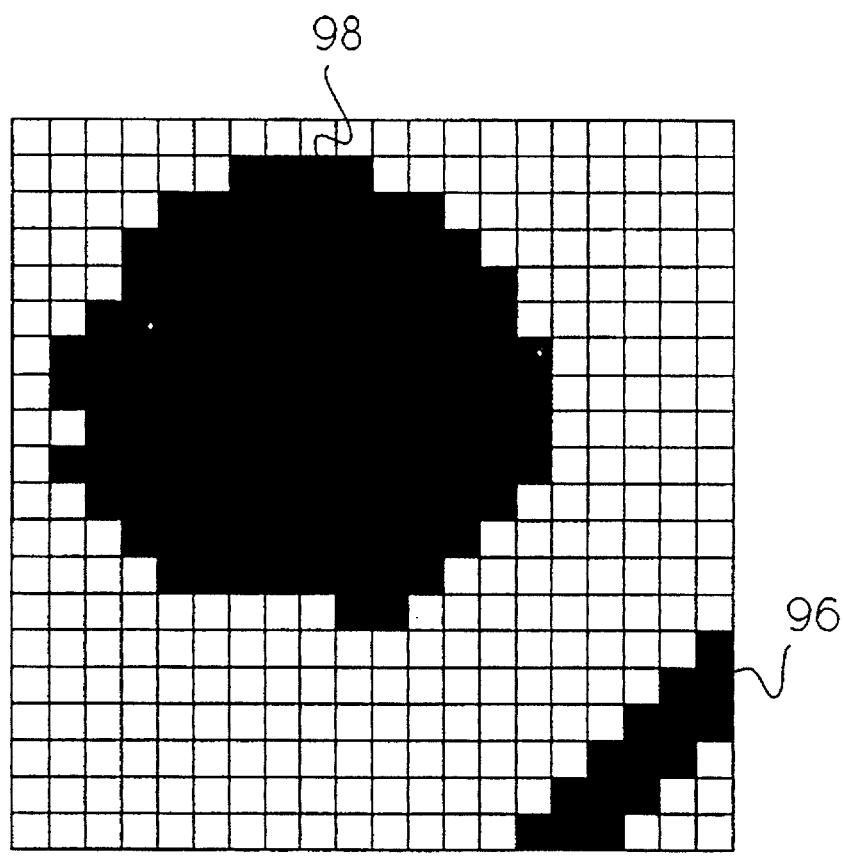
FIG. 9A shows the filled bubble map reduced to binary.
Figure 9B:
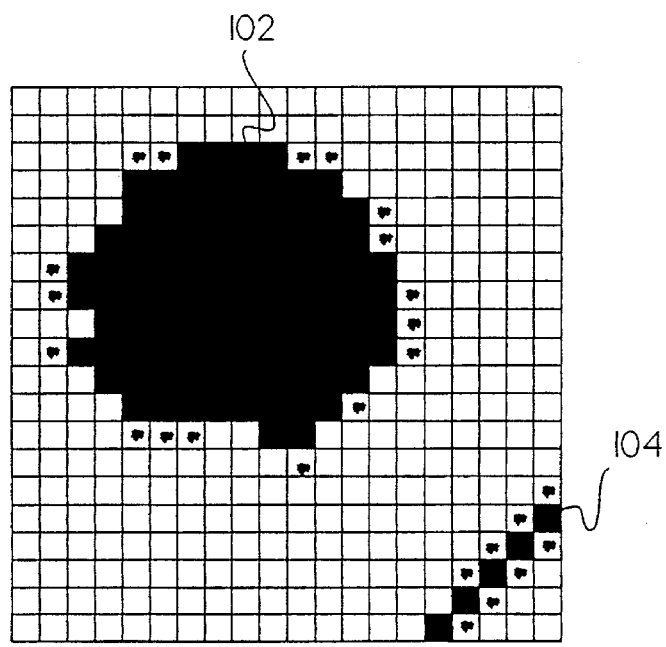
FIG. 9B shows the eroded filled bubble map.

FIG. 9B shows the step of eroding 120 the filled bubble map 98 by a 3×3 "+" shaped structuring element. This erosion decreases the size of the bubbles in the filled bubble map back to the approximate outline from the original map creating the final bubble map 122.

Figure 9C:
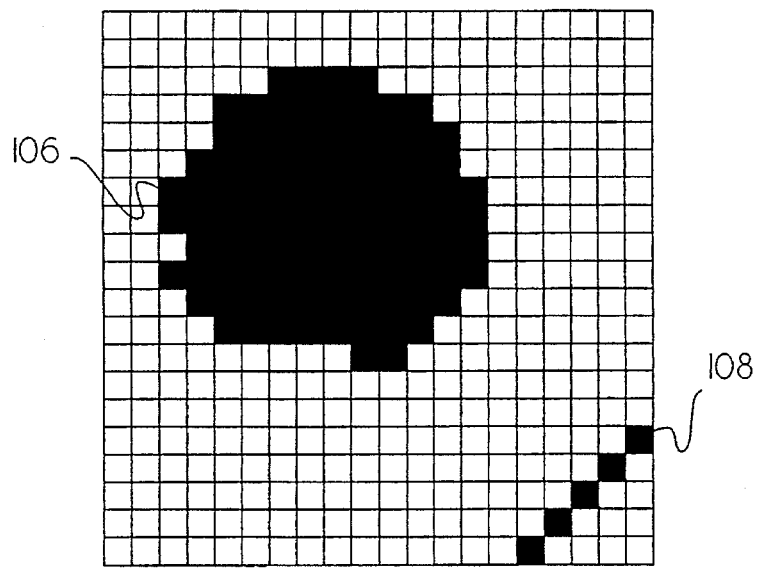
FIG. 9C shows the final bubble map.
Figure 11:
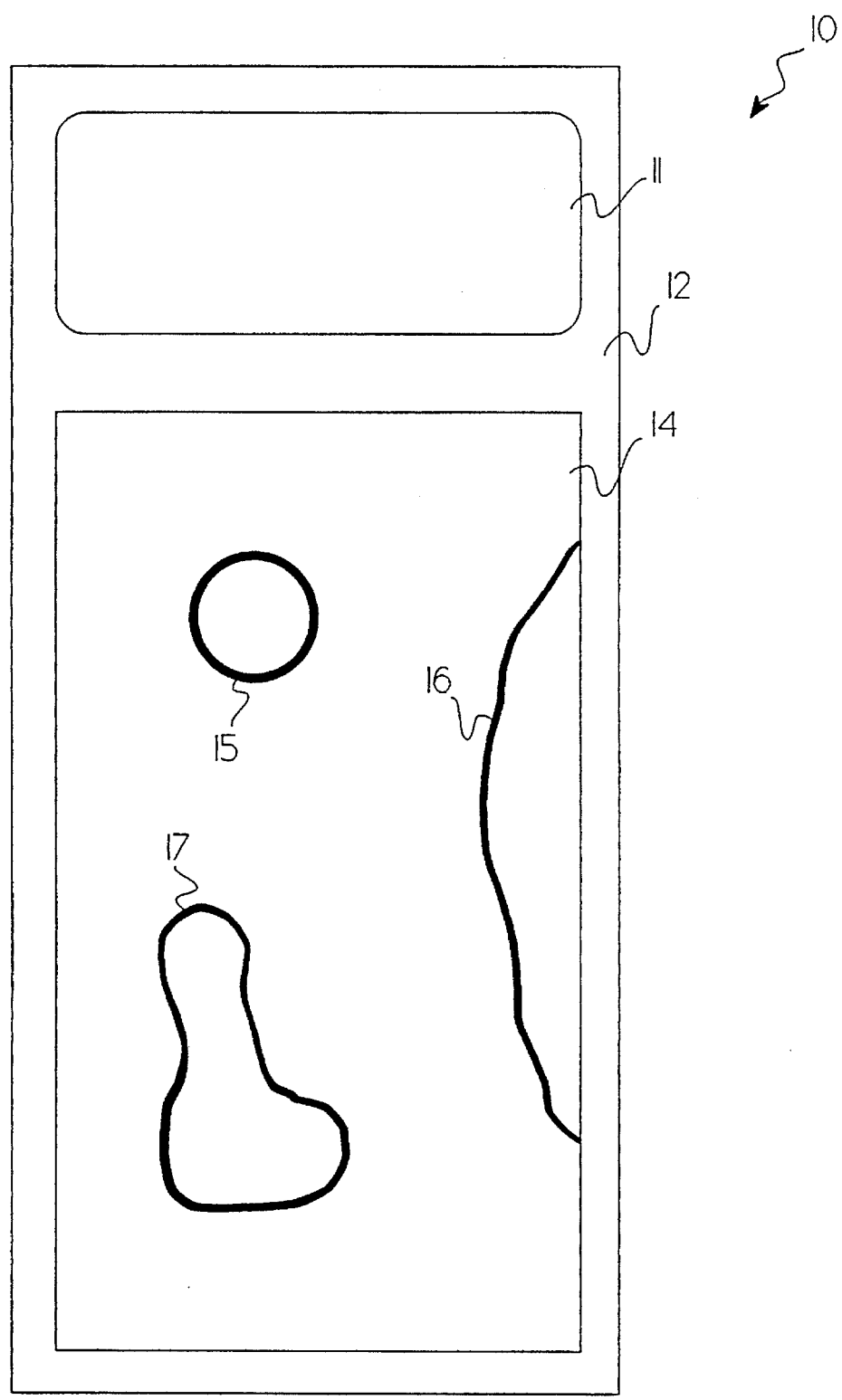
FIG. 11 shows a typical slide with a coverslip having bubbles in its coverslip adhesive.

In the example shown in FIG. 9C, since the bubble fragment 108 in the lower right was far from complete, there was no region which qualified to be filled by the horizontal and vertical fill operations. This case does arise if a void exists under a corner of the coverslip. In this case, the elements corresponding to the bubble edge itself are eliminated, but since insufficient information exists to identify which side of the edge is the interior of the bubble, no more area can be eliminated.

Once the processing is complete, each element in the final bubble map 122 corresponds to one potential 20 x field of view on the slide, and a simple linear map converts between coordinates on the slide and index into the bubble map array. Thus, when fields are selected for 20 x scanning, the final bubble map 122 is first consulted to determine if the field in question lies within a bubble.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A bubble mapper apparatus comprising:
   (a) imaging means for capturing an image of a slide to obtain a representation of the image;

(b) means for detecting bubble edges from images to generate a bubble edge output;

(c) dilation means for dilating the bubble edge output to generate a dilated bubble edge map;

(d) means for connected component analysis on the dilated bubble edge map to produce a labeled bubble map;

(e) means for horizontal and vertical filling the labeled bubble map to produce a binary bubble map; and (f) erosion means for eroding the binary bubble map to produce a final bubble map.

2. The apparatus of claim 1 wherein the imaging means further comprises an automated microscope.

3. The apparatus of claim 2 wherein the automated microscope further comprises a charge coupled device array.

4. The apparatus of claim 1 wherein the dilation means further comprises a 3×3 dilation.

5. The apparatus of claim 1 wherein the means for eroding further comprises a 3×3 erosion.

6. The apparatus of claim 1 wherein the means for detecting bubble edges further comprises a bubble edge detection feature classifier.

7. The apparatus of claim 6 wherein the bubble edge detection feature classifier further comprises a Fisher linear feature combination thresholder.

8. The apparatus of claim 1 wherein the dilation means further comprises a digital computer.

9. The apparatus of claim 1 wherein the means for connected component analysis further comprises a digital computer.

10. The apparatus of claim 1 wherein the means for horizontal and vertical filling further comprises a digital computer.

11. The apparatus of claim 1 herein the erosion means further comprises a digital computer.

12. The apparatus of claim 1 wherein the slide is selected from the group consisting of a biological specimen slide, a gynecological specimen slide, and a slide prepared with a Papanicolaou method.

13. A method of detecting bubble edges comprising the steps of:

(a) obtaining a gray scale image of a biological specimen at a predetermined magnification;

(b) image conditioning the gray scale image to produce a conditioned gray scale image; and (c) segmenting the conditioned gray scale image into objects that are similar to bubble edges.

14. A method of image segmentation comprising the steps of:

(a) obtaining a gray scale image of a biological specimen at a predetermined magnification;

(b) image conditioning the gray scale image to generate a conditioned gray scale image; and (c) segmenting the conditioned gray scale image into objects that are similar to bubble edges.

15. The method of claim 14 further comprises the step of classifying the object as a bubble edge or as a non bubble edge.

16. The method of claim 15 wherein the step of classifying the object further comprises the step of bubble edge detection feature classification.

17. A bubble mapping method comprising the steps of:

(a) imaging a slide having a coverslip to obtain a representation of a biological specimen under the coverslip;

(b) detecting bubble edges from images to generate a bubble edge output;

(c) performing a 3×3 dilation on the bubble edge output to generate a dilated bubble edge map;

(d) performing a connected component analysis on the dilated bubble edge map to produce a labeled bubble map;

(e) performing a horizontal and vertical fill on the labeled bubble map to produce a binary bubble map; and (f) performing a 3×3 erosion on the binary bubble map to produce a final bubble map.

18. The method of claim 17 wherein the slide is selected from the group consisting of a biological specimen slide, a gynecological specimen, and a slide prepared with a Papanicolaou method.

19. A method for detecting bubble edges in an image of a slide having a coverslip comprising the steps of:

(a) acquiring a plurality of images of the coverslip, wherein the plurality of images tiles a region under the coverslip;

(b) image conditioning the plurality of images to generate a conditioned gray scale image;

(c) binomially filtering each conditioned gray scale image to provide a binomially filtered image;

(d) subtracting the conditioned gray scale image from the binomial filtered image to produce a high pass filtered image;

(e) performing object detection on the high pass filtered image to detect objects; and (f) classifying the objects to identify bubble edges.

20. The method of claim 19 further comprising the steps of:

(a) piecing the bubble edges from the plurality of images together to form a map of bubbled edges over the region under the coverslip;

(b) separating the bubbles in the map from each other; and (c) filling the outlines of the distinct bubbles to include the interiors of each bubble.

21. The method of claim 19 wherein each of the plurality of images is approximately 1.408 mm by 1.408 mm in size.

22. The method of claim 19 wherein the plurality of images comprise 4 x gray scale images.

23. A bubble mapping method comprising the steps of:

(a) imaging a slide having a coverslip to obtain a representation of a biological specimen under the coverslip;

(b) detecting bubble edges from the representation of a biological specimen under the coverslip to generate a bubble edge output;

(c) performing a 3×3 dilation on the bubble edge output to generate a dilated bubble edge map;

(d) performing a connected component analysis on the dilated bubble edge map to produce a labeled bubble map;

(e) performing a horizontal and vertical fill on the labeled bubble map to produce a binary bubble map; and (f) performing a 3×3 erosion on the binary bubble map to produce a final bubble map.

24. The method of claim 23 wherein the slide is selected from the group consisting of a biological specimen slide, a gynecological specimen, and a slide prepared with a Papanicolaou method.

25. The apparatus of claim 1 further comprising a means for eliminating the area defined by the bubble map from further processing.

26. The method of claim 17 further comprising the step of eliminating the area defined by the bubble map from further processing.

* * * * *

UNITED STATES PATENT AND TRADEMARK OFFICE
CERTIFICATE OF CORRECTION

PATENT NO. : 5,566,249
DATED : October 15, 1996
INVENTOR(S) : Mikel D. Rosenlof, Chih-Chau L. Kuan It is certified that error appears in the above-identified patent and that said Letters Patent is hereby corrected as shown below:

Column 1, line 28, delete the word "not" and replace it with -- now --.

In the Abstract

Line 10, delete the word "edgest" and replace it with -- edges --.

Signed and Sealed this

Fourth Day of March, 1997

*Attest:*

BRUCE LEHMAN

*Attesting Officer*  Commissioner of Patents and Trademarks